United States Patent
Bestgen et al.

(10) Patent No.: US 8,214,807 B2
(45) Date of Patent: Jul. 3, 2012

(54) CODE PATH TRACKING

(75) Inventors: Robert J. Bestgen, Rochester, MN (US);
Robert D. Driesch, Jr., Rochester, MN (US); Wei Hu, Rochester, MN (US);
Shantan Kethireddy, Rochester, MN (US); Edward J. Miller, Rochester, MN (US); Andrew P. Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1576 days.

(21) Appl. No.: 11/621,666

(22) Filed: Jan. 10, 2007

(65) Prior Publication Data

US 2008/0168427 A1 Jul. 10, 2008

(51) Int. Cl.
*G06F 9/44* (2006.01)

(52) U.S. Cl. ........ 717/128; 717/124; 717/131; 717/133; 717/136; 717/126

(58) Field of Classification Search .................... 717/128
See application file for complete search history.

(56) References Cited

U.S. PATENT DOCUMENTS

| | | | |
|---|---|---|---|
| 5,870,607 A | 2/1999 | Netzer | |
| 6,145,121 A | 11/2000 | Levy et al. | |
| 6,795,963 B1 | 9/2004 | Andersen et al. | |
| 2003/0221187 A1 | 11/2003 | Barsness et al. | |
| 2004/0088699 A1* | 5/2004 | Suresh | 717/174 |
| 2006/0294158 A1* | 12/2006 | Tsyganskiy et al. | 707/202 |
| 2008/0127109 A1* | 5/2008 | Simeon | 717/128 |

OTHER PUBLICATIONS

Burke, Paul; "Using SQL Profiler", Microsoft TechNet, Jun. 2001, pp. 1-6 URL: http://www.microsoft.com/technet/prodtechnol/sql/70/tips/sqlprof.mspx?pf=true>.

* cited by examiner

*Primary Examiner* — Thomas K Pham
(74) *Attorney, Agent, or Firm* — Biggers & Ohanian, LLP (57) ABSTRACT

Methods, systems, and products are provided for code path tracking. Embodiments include identifying an instrumented trace point in software code to be path tracked; identifying a function executed at the instrumented trace point in the software code; identifying parameters for the function executed at the instrumented trace point; and recording a description of the function, the parameters, and the result of the execution of the function using the parameters.

15 Claims, 5 Drawing Sheets

CODE PATH TRACKING

BACKGROUND OF THE INVENTION

1. Field of the Invention

The field of the invention is data processing, or, more specifically, methods, systems, and products for code path tracking.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer software has become more complicated, analyzing problems in the software code and improving functions executed in the software code has also become more difficult. Tools currently exist which can sample instruction paths taken in specific software modules or collect data at trace points built into the software. These coverage tools are somewhat useful but they have several limitations:

- Conventional instruction path sampling cannot be left on for long periods of time due to the overhead incurred in both CPU consumption and memory usage.
- Conventional code path sampling misses code paths executed between samples
- Conventional code path sampling does not provide context. The code has to be inspected to understand why it was or was not executed.
- The overhead of defining and exposing conventional trace point is often high because external commands must be changed and documented. Tools must also be modified with each change.
- Conventional tools provide no vehicle for evaluating alternative functions to potential problematic functions.
- Conventional tools provide no vehicle for replaying the execution of functions.

There is therefore an ongoing need for improvement in code path tracking.

SUMMARY OF THE INVENTION

Methods, systems, and products are provided for code path tracking. Embodiments include identifying an instrumented trace point in software code to be path tracked; identifying a function executed at the instrumented trace point in the software code; identifying parameters for the function executed at the instrumented trace point; and recording a description of the function, the parameters, and the result of the execution of the function using the parameters.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
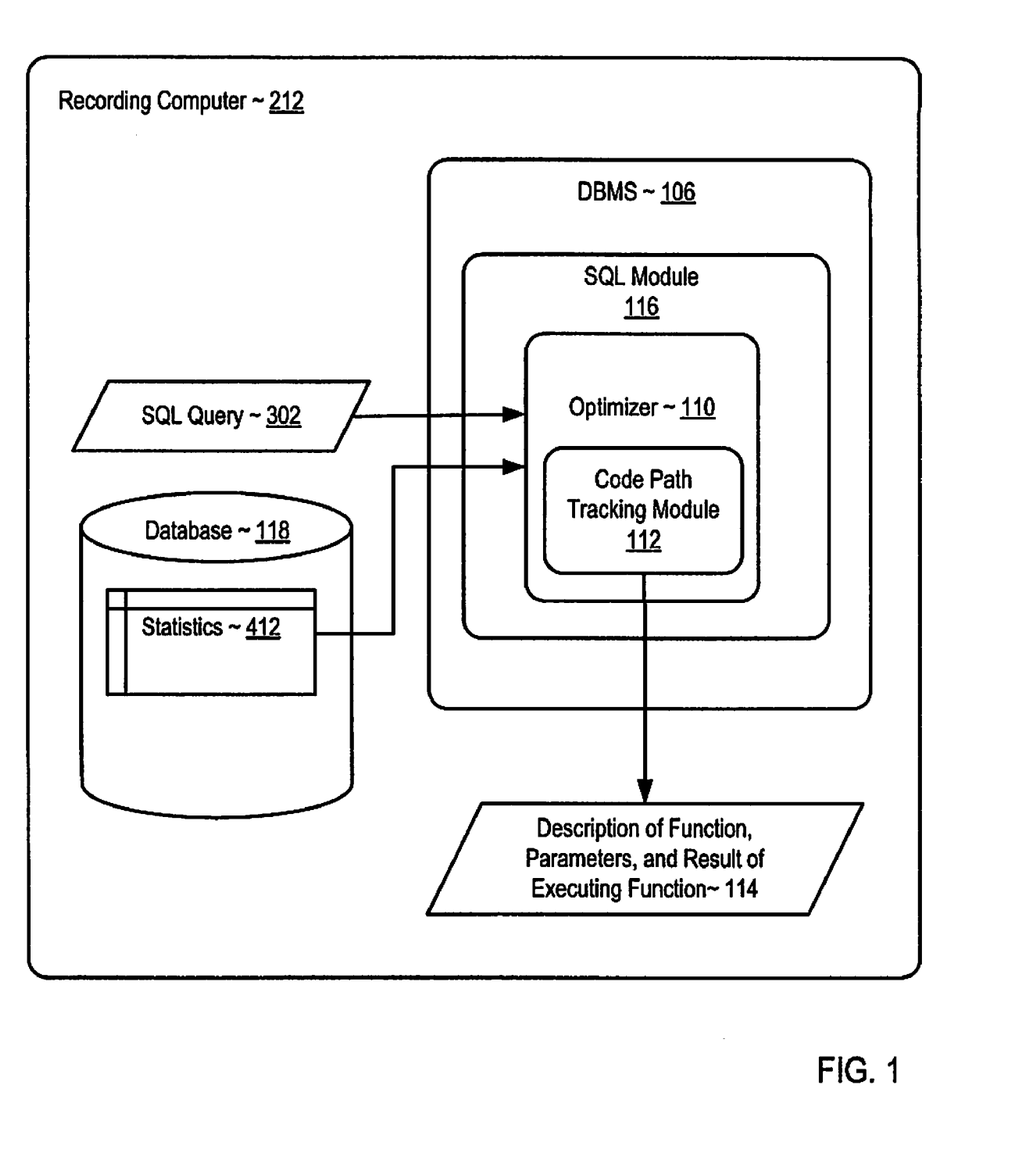
FIG. 1 sets forth a block diagram of an exemplary system for code path tracking according to embodiments of the present invention.

Exemplary methods, systems, and products for code path tracking according to embodiments of the present invention are explained with reference to the accompanying drawings, beginning with FIG. 1. FIG. 1 sets forth a block diagram of an exemplary system for code path tracking according to embodiments of the present invention. The system of FIG. 1 includes a recording computer (212). The computer (212) is labeled a 'recording computer' in this specification to signify that the software code running on the recording computer is being code path tracked according to the present invention and the recording computer is so labeled because code path tracking according to the present invention records a description of a function executed at an instrumented trace point in the software code and records a description of the result of the execution of that function. The recorded description may then be transferred to a replay computer for replay as discussed in more detail below.

This exact architecture of the system of FIG. 1, however, is presented only for explanation, not for limitation of the present invention. Many system architectures as will occur to those of skill in the art are functional for code path tracking according to embodiments of the present invention, and all such architectures are well within the scope of the present invention.

The example of FIG. 1 includes a database management system ('DBMS') (106), computer program instructions for creating an maintaining a database. The exemplary DBMS of FIG. 1 includes an SQL module (116). The SQL module is implemented as computer program instructions that execute an SQL query (302). Each SQL query is carried out by a sequence of database operations specified as an access plan. An access plan is a description of database functions for execution of an SQL query. Taking the following SQL query as an example:

select*from stores, transactions
where stores.storeID=transactions.storeID, an exemplary access plan for this SQL query may be generated as follows:

tablescan stores
join to
index access of transactions

This access plan represents database functions to scan through the stores table and, for each stores record, join all transactions records for the store. The transactions for a store are identified through the storeID field acting as a foreign key. The fact that a selection of transactions records is carried out for each store record in the stores table identifies the join function as iterative.

The system of FIG. 1 includes an optimizer (110) as part of the SQL module. Optimizer (110) optimizes the execution of SQL queries against the DBMS (106). DBMS (106) is a DBMS that administers access to the contents of database (118). Optimizer (110) is implemented as computer program instructions that optimize execution of a SQL query in dependence upon database management statistics. That is, the optimizer (110) uses database statistics (412) from database (118) for optimizing SQL queries against database (118). Database statistics are typically implemented as metadata of a table, such as, for example, metadata of tables of database (118). Database statistics may include, for example:

histogram statistics: a histogram range and a count of values in the range, frequency statistics: a frequency of occurrence of a value in a column, and Cardinality statistics: a count of the number of different values in a column.

These three database statistics are presented for explanation only, not for limitation. The use of any database statistics as will occur to those of skill in the art is well within the scope of the present invention.

The optimizer (110) of FIG. 1 includes a code path tracking module (112). The code path tracking module (112) is implemented as computer program instructions for code path tracking capable of identifying an instrumented trace point in software code to be path tracked; identifying a function executed at the instrumented trace point in the software code; identifying parameters for the function executed at the instrumented trace point; and recording a description of the function, the parameters, and the result of the execution of the function using the parameters.

An instrumented trace point is one or more computer program instructions included at a location in the software code for identifying a function executed at that instrumented trace point; identifying parameters for the function executed at the instrumented trace point; and recording a description of the function, the parameters, and the result of the execution of the function using the parameters. The description of the function, the parameters, and the result of the execution of the function using the parameters may be implemented as an eXtensible markup language ('XML') description. 'XML' refers to the eXtensible Markup Language, a specification developed by the World Wide Web Consortium ('W3C'). XML is a pared-down version of SGML (the Standard Generalized Markup Language). XML was originally intended primarily to encode Web documents, but its use today is much broader than just the Web. It allows designers to create their own customized tags, enabling the definition, transmission, validation, and interpretation of data between applications, between computers and database, and between organizations.

The description of the function, the parameters, and the result of the execution of the function using the parameters may be used to replay the function and the result of the execution of the function for analysis of the quality of the execution of the function. Replaying the function advantageously allows a user to make determinations as to whether to modify the functions or parameters of the functions as will occur to those of skill in the art.

Figure 2:
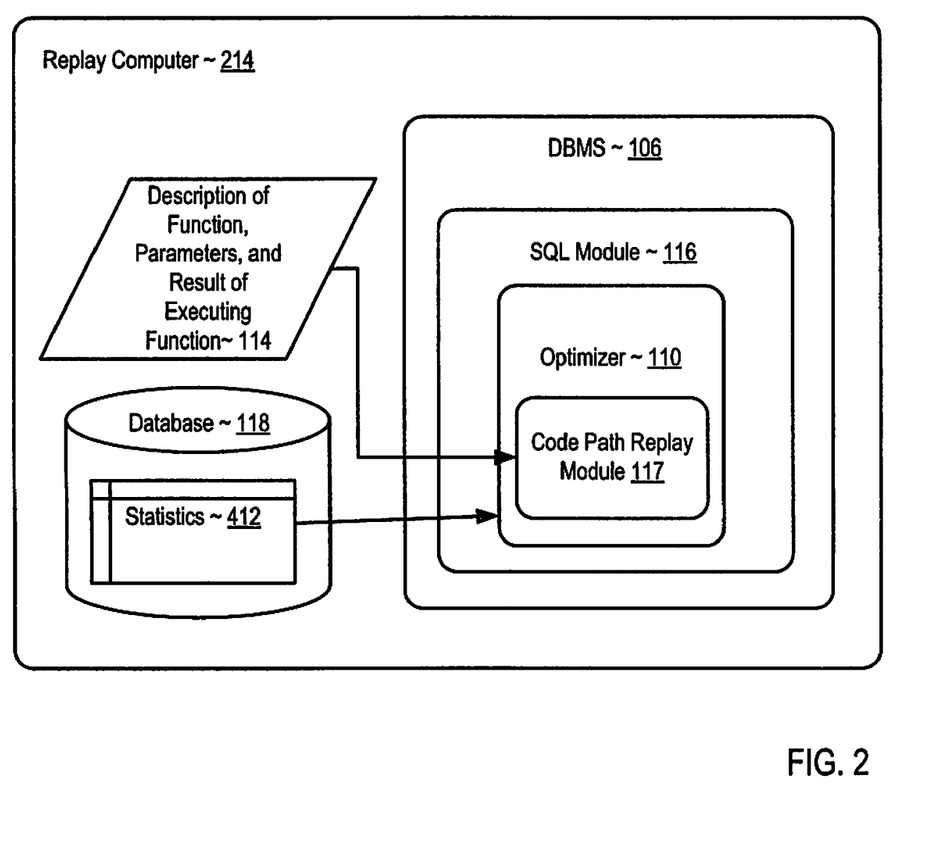
FIG. 2 sets forth a block diagram of a replay computer in accordance with the present invention.

For further explanation, FIG. 2 sets forth a block diagram of a replay computer. The replay computer (214) is so labeled for explanation and not for limitation. The exemplary replay computer (214) also includes a DBMS (106), a SQL module (116), and an optimizer (110). In the example of FIG. 2, however, the optimizer includes a code path replay module (117). The code path replay module (117) includes computer program instructions for receiving the recorded description of the function, the parameters, and the result of the execution of the function using the parameters recorded by the recording computer and replaying in dependence upon the recorded description the execution of the function using the parameters. The code path replay module (114) of FIG. 2 also includes computer program instructions capable of receiving from a user an alternative function; executing the alternative function; and displaying to the user the result of the execution of the alternative function.

The exemplary recording computer of FIG. 1 and the exemplary replay computer of FIG. 2 are presented for ease of explanation of different aspects of code path tracking according to the present invention. While in many cases it may be advantageous to record a description of the function, the parameters, and the result of the execution of the function using the parameters on one computer and replay the function in dependence upon the description on another computer, in other cases the recording of the description and the replaying of the function may occur on the same computer and all such cases are well within the scope of the present invention.

As mentioned above, code path tracking in accordance with the present invention is generally implemented with computers, that is, with automated computing machinery. For further explanation, FIG. 3 sets forth a block diagram of automated computing machinery comprising an exemplary computer (152) useful in code path tracking according to embodiments of the present invention. The computer (152) of FIG. 3 includes at least one computer processor (156) or 'CPU' as well as random access memory (168) ("RAM") which is connected through a system bus (160) to processor (156) and to other components of the computer. Stored in RAM (168) is DBMS (106), computer program instructions for database management. The DBMS (106) of FIG. 3 includes an SQL module (116), which in turn includes an optimizer (110).

Figure 3:
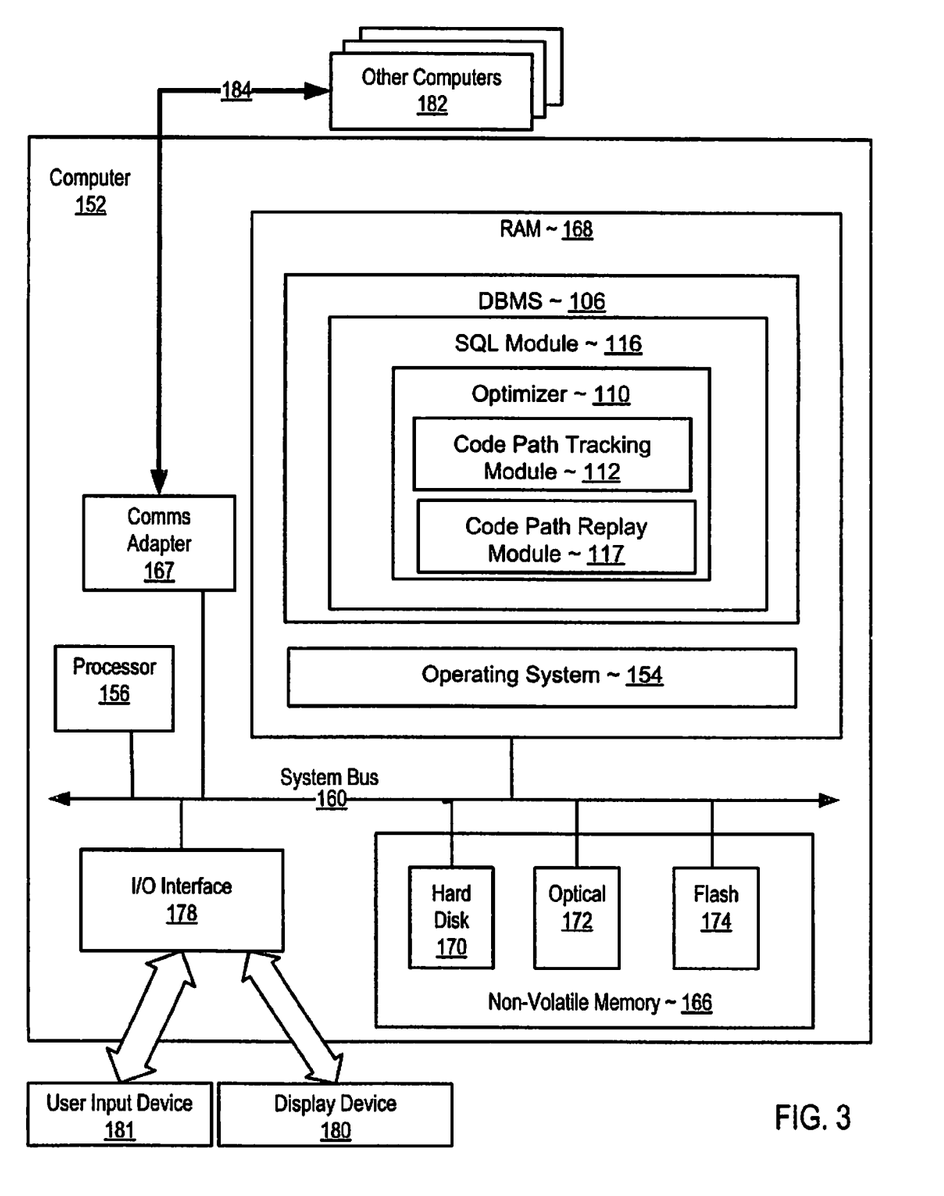
FIG. 3 sets forth a block diagram of automated computing machinery comprising an exemplary computer useful in code path tracking according to embodiments of the present invention.

The optimizer (110) of FIG. 3 includes a code path tracking module (112). The code path tracking module (112) includes computer program instructions for identifying an instrumented trace point in software code to be path tracked, which in this example is an optimizer, identifying a function executed at the instrumented trace point in the software code; identifying parameters for the function executed at the instrumented trace point; and recording a description of the function, the parameters, and the result of the execution of the function using the parameters.

The optimizer (110) of FIG. 3 also includes a code path replay module (117). The code path replay module (117) includes computer program instructions for receiving the recorded description of the function, the parameters, and the result of the execution of the function using the parameters; and replaying in dependence upon the recorded description the execution of the function using the parameters.

Also stored in RAM (168) is an operating system (154). Operating systems useful in computers according to embodiments of the present invention include UNIX™, Linux™, Microsoft NT™, AIX™, IBM's i5os, and many others as will occur to those of skill in the art. Operating system (154), DBMS (106), and optimizer (112), code path tracking module (112), and code path replay module (117) in the example of FIG. 3 are shown in RAM (154), but many components of such software typically are stored in non-volatile memory (166) also.

Computer (152) of FIG. 3 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 3 includes a communications adapter (167) for implementing connections for data communications (184) to other computers (182). Such connections may include serial connections such as RS-232 connections, connections through external buses such as USB connections, connections through data communications networks such as TCP/IP connections, and others as will occur to those of skill in the art. Communications adapters implement the hardware level of connections for data communications through which one computer sends data communications another computer, directly or through a network. Examples of communications adapters useful for code path tracking according to embodiments of the present invention include modems for wired dial-up connections, Ethernet (IEEE 802.3) adapters for wired network connections, and 802.11b adapters for wireless network connections.

Figure 4:
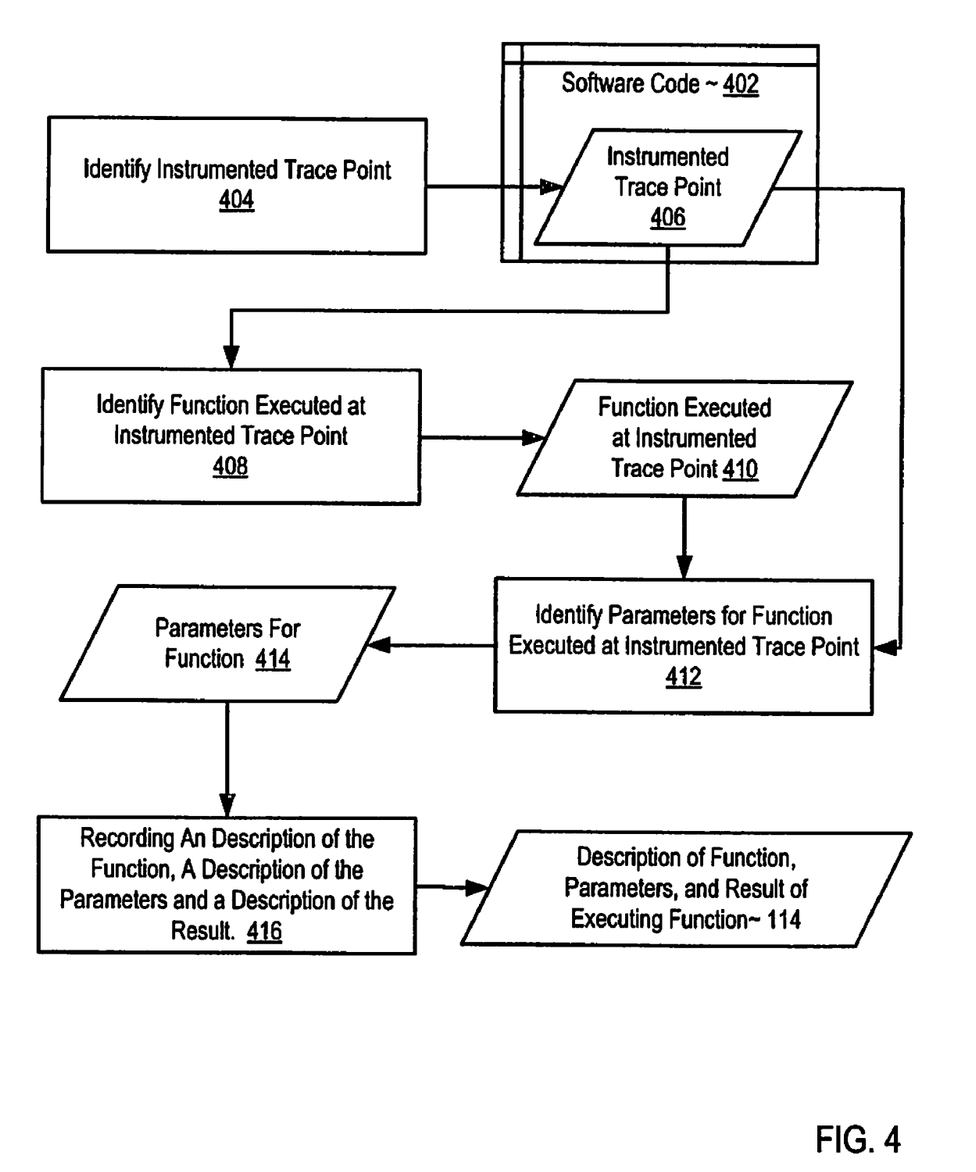
FIG. 4 sets forth a flow chart of a computer-implemented method for code path tracking.

For further explanation, FIG. 4 sets forth a flow chart of a computer-implemented method for code path tracking. The method of FIG. 4 includes identifying (404) an instrumented trace point (406) in software code (402) to be path tracked. As mentioned above, an instrumented trace point is a location in the software code that includes computer program instructions for identifying a function executed at that instrumented trace point; identifying parameters for the function executed at the instrumented trace point; and recording a description of the function, the parameters, and the result of the execution of the function using the parameters.

An instrumented trace point may be implemented as a call into an application programming interface ('API') capable of recording a description of the function, the parameters, and the result of the execution of the function using the parameters. Such a call may be parameterized with an identification of a function executed at the instrumented trace point, as well as parameters of the function executed at the trace point.

The individual instrumented trace points may be user selected. That is, the method of FIG. 4 may also include instrumenting a user selected trace point. Instrumenting a user selected trace point may be carried out by receiving a user selection of a trace point to be instrumented to record a description of the function of the software code executed at that trace point, the parameters, and the result of the execution of the function using the parameters.

Consider for example the following exemplary instrumented trace point class:

```
class Trace
{
public:
    enum points {tryHash, tryIndex, tryScan, tryList, ...}
    enum pointDef {"Attempt Hashing","Attempt Index", "Attempt Scan",
"Build List", ...}
    void register(points);
    void begin(points);
    void end(points);
```
-continued
```
    void generateDefinition(int fd);
    void generateSummary(int fd);
    ...
}
```

The exemplary class contains simple helper methods such as 'register(enum value)' that provide for a user to add instrumented trace points into the software in question to path track a function at the instrumented trace point. The software is then changed to incorporate these instrumented trace points, compiled and executed.

As mentioned above, the instrumented trace point further may be implemented as a decision point in a database optimizer. Such a decision point may be a location of software code executing a particular sequence of database operations implementing an access plan. An access plan is a description of database functions for execution of an SQL query. Taking the following SQL query as an example:

```
select * from stores, transactions
    where stores.storeID = transactions.storeID,
``` an optimizer may generate the following exemplary access plan for this SQL query:

```
tablescan stores
join to
index access of transactions
```

This access plan represents database functions to scan through the stores table and, for each stores record, join all transactions records for the store. The transactions for a store are identified through the storeID field acting as a foreign key. The fact that a selection of transactions records is carried out for each store record in the stores table identifies the join function as iterative.

The method of FIG. 4 also includes identifying (408) a function (410) executed at the instrumented trace point (406) in the software code. A function executed at the instrumented trace point (406) in the software code may be any function in the software code to be path tracked according to embodiments of the present invention. One such function may be, for example, one or more of a particular sequence of database operations implementing an access plan The method of FIG. 4 also includes identifying parameters (412) for the function (410) executed at the instrumented trace point (406). Parameters for the function identify the values or data structures against which the function operates. For example, an access plan for an SQL query may include 'tablescan stores' for the function 'tablescan' operating on a parameter table 'stores.'

The method of FIG. 4 also includes recording (416) a description (114) of the function, the parameters, and the result of the execution of the function using the parameters. Recording a description of the function, the parameters, and the result of the execution of the function using the parameters according to the method of FIG. 4 may be carried out by creating an XML description of the function, the parameters, and the result of the execution of the function using the parameters. The XML description may also conform to an XML Schema Definition ('XSD'). An XSD is an instance of an XML schema typically written in XML Schema. An XSD defines a type of XML document in terms of constraints upon what elements and attributes may appear in the document, their relationship to each other, and what types of data may be in them.

As mentioned above, the description of the function, the parameters, and the result of the execution of the function using the parameters may be used to replay the function and the result of the execution of the function for analysis of the quality of the execution of the function. Replaying the function advantageously allows a user to make determinations as to whether to modify the functions or parameters of the functions as will occur to those of skill in the art. For further explanation, therefore, FIG. 5 sets forth a flow chart illustrating further aspects of code path tracking according to the present invention. The method of FIG. 5 includes receiving (502) the recorded description (114) of the function, the parameters, and the result of the execution of the function using the parameters. Receiving (502) the recorded description (114) of the function, the parameters, and the result of the execution of the function using the parameters may be carried out by receiving the description from a code path tracking module operating locally or operating remotely as mentioned above.

Figure 5:
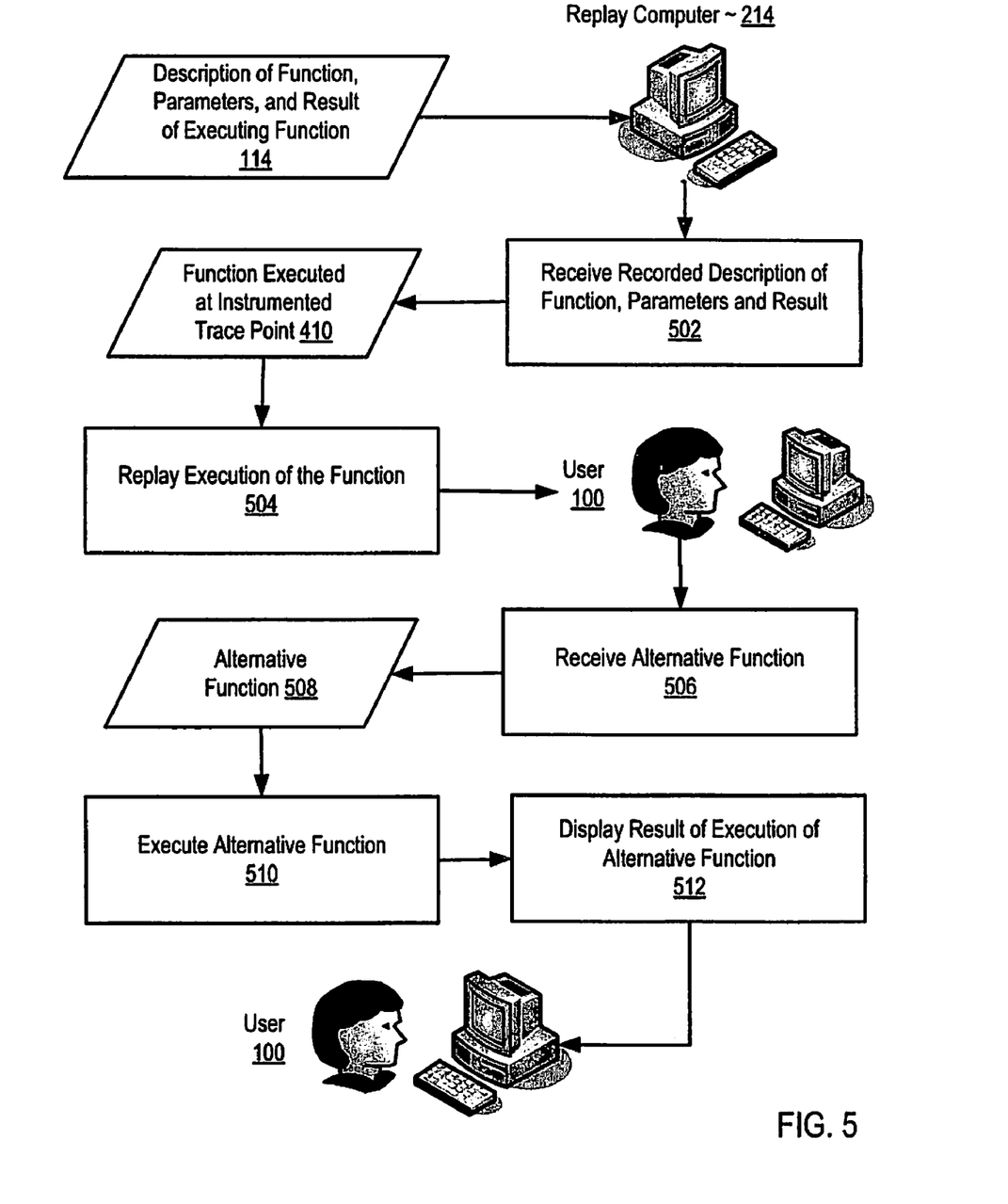
FIG. 5 sets forth a flow chart illustrating further aspects of code path tracking according to the present invention.

The method of FIG. 5 also includes replaying (504) in dependence upon the recorded description (114) the execution of the function using the parameters. Replaying (504) in dependence upon the recorded description (114) the execution of the function using the parameters may be carried out by replicating the execution of the functioning dependence upon the recorded description (114) and displaying results of the execution, and in some cases, additional statistics describing the execution of the function such as execution time, CPU consumption and so on as will occur to those of skill in the art. Replaying the execution of the function advantageously allows a user to individually analyze the execution of functions at instrumented trace points.

In some cases, relaying the execution of the function may demonstrate flaws in the function or parameters or other factors surrounding the execution of the function. To aid in improving the software code, the method of FIG. 5 also includes receiving (506) from a user (100) an alternative function (508). Receiving (506) from a user (100) an alternative function (508) may be carried out through a user interface designed to receive from a user selections of alternative functions for execution.

The method of FIG. 5 also includes executing (510) the alternative function (508) and displaying (512) to the user (100) the result of the execution of the alternative function. Executing (510) the alternative function (508) and displaying (512) to the user (100) the result of the execution of the alternative function advantageously provides a vehicle for improving functions executed at instrumented trace decision points.

Receiving from a user an alternative function, executing the alternative function, and displaying to the user the result of the execution of the alternative function may occur in real time, or alternatively, may include receiving from a user an alternative function either manually or programmatically and at some later date executing the alternative function and displaying the result of the execution of the alternative function.

Code path tracking has been described largely in the context of an optimizer for a SQL module in a DBMS. This is for explanation, and not for limitation. In fact, code path tracking according to embodiments of the present invention may be usefully implemented in many contexts as will occur to those of skill in the art and all such contexts are well within the scope of the present invention.

Exemplary embodiments of the present invention are described largely in the context of a fully functional computer system for code path tracking. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for code path tracking, the method comprising:
    identifying an instrumented trace point in software code to be path tracked;
    identifying a function executed at the instrumented trace point in the software code;
    identifying parameters for the function executed at the instrumented trace point; and
    recording a description of the function, the parameters, and the result of the execution of the function using the parameters, wherein recording a description of the function, the parameters, and the result of the execution of the function using the parameters further comprises creating an XML description of the function, the parameters, and the result of the execution of the function using the parameters.

2. The method claim 1 further comprising:
    receiving the recorded description of the function, the parameters, and the result of the execution of the function using the parameters; and
    replaying in dependence upon the recorded description the execution of the function using the parameters.

3. The method claim 2 further comprising:
    receiving from a user an alternative function;
    executing the alternative function; and
    displaying to the user the result of the execution of the alternative function.

4. The method of claim 1 wherein the instrumented trace point further comprises a decision point in a database optimizer.

5. The method of claim 1 further comprising instrumenting a user selected trace point.

6. A system for code path tracking, the system comprising:
a computer processor;
a computer memory operatively coupled to the computer processor, the computer memory having disposed within it computer program instructions capable of:
identifying an instrumented trace point in software code to be path tracked;
identifying a function executed at the instrumented trace point in the software code;
identifying parameters for the function executed at the instrumented trace point; and
recording a description of the function, the parameters, and the result of the execution of the function using the parameters, wherein recording a description of the function, the parameters, and the result of the execution of the function using the parameters further comprises creating an XML description of the function, the parameters, and the result of the execution of the function using the parameters.

7. The system claim 6 wherein the computer memory also has disposed within it computer program instructions capable of:
receiving the recorded description of the function, the parameters, and the result of the execution of the function using the parameters; and
replaying in dependence upon the recorded description the execution of the function using the parameters.

8. The system claim 7 wherein the computer memory also has disposed within it computer program instructions capable of:
receiving from a user an alternative function;
executing the alternative function; and
displaying to the user the result of the execution of the alternative function.

9. The system of claim 6 wherein the instrumented trace point further comprises a decision point in a database optimizer.

10. The system of claim 6 wherein the computer memory also has disposed within it computer program instructions capable of instrumenting a user selected trace point.

11. A computer program product for code path tracking, the computer program product embodied on a computer-readable recordable medium, the computer program product comprising:

computer program instructions for identifying an instrumented trace point in software code to be path tracked;
computer program instructions for identifying a function executed at the instrumented trace point in the software code;
computer program instructions for identifying parameters for the function executed at the instrumented trace point; and
computer program instructions for recording a description of the function, the parameters, and the result of the execution of the function using the parameters, wherein recording a description of the function, the parameters, and the result of the execution of the function using the parameters further comprises creating an XML description of the function, the parameters, and the result of the execution of the function using the parameters.

12. The computer program product claim 11 further comprising:
computer program instructions for receiving the recorded description of the function, the parameters, and the result of the execution of the function using the parameters; and
computer program instructions for replaying in dependence upon the recorded description the execution of the function using the parameters.

13. The computer program product claim 12 further comprising:
computer program instructions for receiving from a user an alternative function;
computer program instructions for executing the alternative function; and
computer program instructions for displaying to the user the result of the execution of the alternative function.

14. The computer program product claim 11 wherein the instrumented trace point further comprises a decision point in a database optimizer.

15. The computer program product of claim 11 further comprising computer program instructions for instrumenting a user selected trace point.

* * * * *